(12) United States Patent
Ruan et al.

(10) Patent No.: US 9,020,270 B2
(45) Date of Patent: Apr. 28, 2015

(54) IMAGE PROCESSING DEVICE, IMAGE PROCESSING METHOD, IMAGE PROCESSING CONTROL PROGRAM, AND RECORDING MEDIUM

(71) Applicant: OMRON Corporation, Kyoto-shi, Kyoto (JP)

(72) Inventors: Xiang Ruan, Shiga (JP); Lu Huchuan, Liaoning Province (CN); Tong Na, Liaoning Province (CN)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/228,074

(22) Filed: Mar. 27, 2014

(65) Prior Publication Data

US 2014/0321754 A1    Oct. 30, 2014

(30) Foreign Application Priority Data

Apr. 26, 2013    (JP) ................................. 2013-094756

(51) Int. Cl.
*G06K 9/46* (2006.01)
*G06T 7/00* (2006.01)

(52) U.S. Cl.
CPC ............ *G06K 9/4671* (2013.01); *G06T 7/0081* (2013.01); *G06T 7/0087* (2013.01); *G06T 2207/10024* (2013.01); *G06T 2207/20164* (2013.01)

(58) Field of Classification Search
None
See application file for complete search history.

(56) References Cited

U.S. PATENT DOCUMENTS

2013/0182931 A1*  7/2013  Fan et al. ...................... 382/131
2013/0336582 A1* 12/2013  Dai ............................... 382/165

FOREIGN PATENT DOCUMENTS

JP    2010-258914 A    11/2010

* cited by examiner

*Primary Examiner* — Daniel Mariam
(74) *Attorney, Agent, or Firm* — Osha Liang LLP

(57) ABSTRACT

An image processing device configured to detect a salient region from an image has a pixel small-region image generating unit that generates a pixel small-region image using, as a unit, a pixel small region made of pixels adjacent to one another and whose luminance values or chromaticity are similar, from the image, a prior probability calculator that calculates prior probability of likelihood of the salient region for each of the pixels of the image, a region generating unit that generates a salient-region-containing region having high possibility of containing a salient region on the basis of a corner point extracted from the image, and a likelihood calculator.

20 Claims, 7 Drawing Sheets

IMAGE PROCESSING DEVICE, IMAGE PROCESSING METHOD, IMAGE PROCESSING CONTROL PROGRAM, AND RECORDING MEDIUM

BACKGROUND

1. Field

The present invention relates to an image processing device, an image processing method, and an image processing control program detecting a saliency region in an image, and a recording medium.

2. Related Art

In the field of image processing, conventionally, an image processing device detecting (extracting), from the image, an image region expected to be noted by a human in an image or a salient region as an image region to be noted is known. By calculating saliency measure in each of points in the image by using such a salient region detecting technique, a salient map image indicative of the saliency measure in each of the points in the image is generated.

Such salient region detection or the salient region detecting technique is used, for example, to detect a subject in an image.

As algorithms for the salient region detection, a learning base algorithm and a physical model base algorithm exist.

In the learning base algorithm, an image processing device is caused to perform learning for the salient region detection by using a large amount of a learning database and, after that, a salient region is detected on the basis of the learning result. On the other hand, in the physical model base algorithm, a salient region is calculated by using an equation obtained by approximating a recognition model of a human or another object.

In the learning base algorithm, the performance of detecting a salient region by the image processing device depends on the content of the learning database. It is, however, difficult to build a learning database of salient regions.

In the physical model base algorithm, the equation obtained by approximating a human recognition model has to be used. However, a human physical model is complicated and cannot be easily expressed by an equation. Perfect definition of a human physical model has not been realized yet.

For example, Japanese Unexamined Patent Application Publication No. 2010-258914 describes a salient region image generating device which extracts a salient region from an image and realizes a region segmentation between the salient region and the other region without building a learning database of images and defining a recognition model in advance.

Concretely, in the salient region image generating device, from input images constructing a frame of an input image, a salient region prior probability image expressing probability of being a salient region and a feature likelihood expressing likelihood of an image feature amount included in each of the salient region and the region other than the salient region. The salient region image generating device extracts a salient region image expressing a salient region in the input image on the basis of the input image, the salient image prior probability image, and the feature amount likelihood.

The literature describes that, consequently, also in the case where prior information regarding an object region and a background region in an input image is not given, the salient region image generating device can extract a salient region from the input image and perform image region segmentation.

E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010 disclose a method of calculating a saliency measure by using the Bayes' theorem.

SUMMARY

In the salient region image generating device described in Japanese Unexamined Patent Application Publication No. 2010-258914, to extract a salient region image, first, a prior probability image is generated from input images constructing a frame at certain time of an input video. After that, on the basis of a salient region image generated from an input image one unit time ago since the above-described certain time, a prior probability image at the certain time is updated. Using the updated prior probability image, the salient region image is extracted.

That is, in the salient region image generating device, to extract a salient region from a certain input image, a plurality of input images including the certain input image are necessary. Consequently, the salient region image generating device cannot extract a salient region image from a still image. Further, in the salient region image generating device, since a plurality of input images are used in the salient region extracting process, a load on a computing device executing the extracting process may be large.

In E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010, it is assumed that the prior probability of a salient region is a constant.

For example, in E. Rahtu, J. Kannala, M. Salo, and J. Heikkila, "Segmenting salient objects from images and videos", in Proceedings of European Conference on Computer Vision, 2010, it is assumed that a distribution Z of pixels in a predetermined rectangular window W has a probability density function p of a constant in a kernel K and a border B of the rectangular window W.

Consequently, in E. Rahtu, J. Kannala, M. Salo, and J. Heikkila, "Segmenting salient objects from images and videos", in Proceedings of European Conference on Computer Vision, 2010, the saliency measure $S_0(x)$ of a pixel x in an image depends only on normalized histograms $P(F(x)|H_0)$ and $P(F(x)|H_1)$ in the kernel K and the border B. $H_0$ and $H_1$ are events of the distribution Z of pixels included in the kernel K and the border B, respectively.

The normalized histograms $P(F(x)|H_0)$ and $P(F(x)|H_1)$ correspond to likelihood of the salient region and likelihood of the background, respectively.

Therefore, a calculation result of the saliency measure $S_0(x)$ in E. Rahtu, J. Kannala, M. Salo, and J. Heikkila, "Segmenting salient objects from images and videos", in Proceedings of European Conference on Computer Vision, 2010 becomes equal to a result of calculation using a general physical model depending only on likelihood. In other words, in E. Rahtu, J. Kannala, M. Salo, and J. Heikkila, "Segmenting salient objects from images and videos", in Proceedings of European Conference on Computer Vision, 2010, it is assumed that the probability density function (corresponding to the prior probability) is a constant. Consequently, the Bayes' theorem including not only the term of likelihood but also the term of prior probability is not effectively used.

An image processing device according to one or more embodiments of the present invention may detect a salient region from a single image with high precision by effectively using the Bayes' theorem even in the case where prior information regarding a salient region and a background region is not given at all.

An image processing device according to the present invention is configured to detect a salient region from an image, and includes: a pixel small-region image generating unit configured to generate a pixel small-region image using, as a unit, a pixel small region made of pixels adjacent to one another and whose luminance values and/or chromaticity are similar, from the image; a prior probability calculating unit configured to calculate prior probability of likelihood of the salient region for each of the pixels of the image; a region generating unit configured to generate a salient-region-containing region having high possibility of containing a salient region on the basis of a corner point extracted from the image; a likelihood calculating unit configured to calculate likelihood of the salient region, for each of pixels of the image so that likelihood of the salient region is higher for a pixel having the same luminance value and/or chromaticity as that of larger number of pixels included in the pixel small region; and a salient region detecting unit configured to calculate posterior probability of likelihood of the salient region by using the prior probability and likelihood of the salient region. The prior probability calculating unit increases the prior probability of each of pixels constructing a pixel small region included in the pixel small-region image and having larger color distance from an adjacent pixel small region.

An image processing method according to a one or more embodiments of the present invention is configured to detect a salient region from an image, and includes: a pixel small-region image generating step of generating a pixel small-region image using, as a unit, a pixel small region made of pixels adjacent to one another and whose luminance values and/or chromaticity are similar, from the image; a prior probability calculating step of calculating prior probability for each of pixels of the image so as to increase the prior probability of likelihood of the salient region for each of pixels constructing a pixel small region having a larger color distance from an adjacent pixel small region, in the pixel small region included in the pixel small-region image; a region generating step of generating a salient-region-containing region having high possibility of comprising a salient region on the basis of a corner point extracted from the image; a likelihood calculating step of calculating likelihood of the salient region for each of pixels of the image so that the likelihood of the salient region is higher for a pixel having the same luminance value and/or chromaticity as that of larger number of pixels included in the salient-region-containing region; and a salient region detecting step of calculating posterior probability of likelihood of the salient region by using the prior probability and likelihood of the salient region.

A corner point is a conspicuous point in an image and, generally, is often generated in the border between a salient region and the background. Consequently, the ratio of a salient region in the salient-region-containing region generated by connecting the corner points is high.

In each of the above-described configurations, the prior probability of likelihood of a salient region is calculated for each of pixels of an image. The prior probability is used to obtain posterior probability of likelihood of a salient region.

As described in E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010, conventionally, at the time of obtaining the posterior probability of a salient region by using the Bayes' theorem, the prior probability of a salient region is a constant. Consequently, even in the configuration of obtaining posterior probability of a salient region by using the Bayes' theorem like in one or more embodiments of the present invention, the precision of the prior probability of a salient region in the conventional configuration, the precision corresponding to a specific image, is lower than that of the prior probability in one or more embodiments of the present invention. As a result, in the conventional configuration, the precision of posterior probability of a salient region is also low.

On the other hand, in each of the above-described configurations according to one or more embodiments of the present invention, the prior probability of a salient region is obtained for each of pixels of an image. Consequently, the prior probability of a salient image more corresponds to a specific image, and precision is higher as compared with the conventional technique.

As a result, the precision of posterior probability of a salient region obtained by substituting the prior probability into the Bayes' theorem becomes higher than that of the conventional technique. In other words, in each of the above-described configurations, the region of an image can be detected with high precision.

In each of the configurations, at the time of extracting a salient region, only one image is necessary. That is, a plurality of images are unnecessary unlike the conventional configuration described in Japanese Unexamined Patent Application Publication No. 2010-258914.

Consequently, a salient region can be extracted from a still image such as an image captured by a camera, and salient region extraction can be performed by a process of smaller load as compared with the conventional configuration of using a plurality of images at the time of a salient region extracting process.

As described above, in one or more embodiments of the present invention, also in the case where prior information of a salient region and a background region is not given at all, a salient region can be extracted with high precision from a single image.

The image processing method can be realized also by a computer. In this case, by making a computer execute processes including the above-described steps, an image processing program configured to make a computer realize the steps of the image processing method and a computer-readable recording medium in which the image processing program is stored lie within the scope of the present invention.

Further, in the image processing device according to one or more embodiments of the present invention, as an area of another adjacent pixel small region is larger, the prior probability calculating unit may increase the prior probability of each of pixels constructing the pixel small region.

With the configuration, when the area of a pixel small region in the periphery of a certain pixel small region is larger than that of the certain pixel small region, the prior probability of a pixel included in the pixel small region is higher.

The pixel small region is constructed by a group of pixels whose color or luminance values or the like are similar to one another. Consequently, in the case where the area of a certain pixel small region is large, in the pixel small region, a number of pixels whose color or luminance values or the like are comparatively constant are adjacent to one another. As described above, when the region in which the color or luminance values or the like are comparatively constant is large, the region is a region to be noted in an image, that is, a salient region.

In the case where a pixel small region as a salient region exists so as to be adjacent to a certain pixel small region, the possibility that the region of the pixel small region is also a salient region is high.

Therefore, with the configuration, the prior probability of a pixel having high possibility of being a salient region can be increased.

Further, in the image processing device according to one or more embodiments of the present invention, as a distance between a pixel small region and center of the image is closer, the prior probability calculating unit may increases prior probability of each of pixels constructing the pixel small region.

With the configuration, the prior probability of a pixel close to the center of an image is high The possibility that a center part of an image is a salient region of the image is high.

Therefore, with the configuration, the prior probability of a pixel having high possibility of being a salient region can be made high.

Further, the image processing device according to one or more embodiments of the present invention may further include an edge point correcting unit configured to perform a correction, in the case where the number of edge points included in the pixel small region is equal to or less than a predetermined number, so as to decrease the prior probability of each of pixels constructing a pixel small region as the number of edge points of the pixel small region is larger, and in the case where the number of edge points included in the pixel small region is larger than the predetermined number, so as to set the prior probability of each of the pixels constructing the pixel small region to zero.

The edge (contour) point of an image is a point at which the contrast difference between adjacent pixels is large. In the case where a number of such edge points exist in a relatively small region, the possibility that the region is background is high.

With the configuration, the prior probability of a pixel as a component of a pixel small region having a number of edge points becomes low, so that the precision of prior probability of a salient region can be improved. With respect to a pixel small region having the number of edge points larger than a predetermined number, the prior probability of a pixel as a component of the pixel small region becomes zero, so that the precision of prior probability of a salient region can be further improved.

Further, in the image processing device according to one or more embodiments of the present invention, the region generating unit generates a convex hull region in which the internal angle of each of vertexes is smaller than 180 degrees as the salient-region-containing region. The image processing device further includes a convex hull region adjusting unit, with respect to an upper pixel small region overlapping at least a part of the convex hull region, in the case where pixels included in the convex hull region in pixels constructing the pixel small region are larger than a predetermined first ratio, configured to include the entire pixel small region in the convex hull region, and in the case where pixels included in the convex hull region in pixels constructing the pixel small region are smaller than a predetermined second ratio, configured to exclude the part overlapping the pixel small region of the convex hull region from the convex hull region. The likelihood calculating unit may calculate likelihood of the salient region for each of the pixels of the image on the basis of the convex hull region adjusted by the convex hull region adjusting unit.

In the configuration, a convex hull region is generated by using corner points extracted from an image.

In the configuration, a convex hull region is adjusted according to whether pixels of a predetermined ratio constructing a superpixel overlapping a generated convex hull region are included in the convex hull region or not.

As a result, the contour of the adjusted convex hull region matches that of the superpixel. As described above, by adjusting the shape of the convex hull region, a process on a superpixel image made by a superpixel is performed more easily.

In the configuration, the likelihood of a salient region is higher in a pixel having the same luminance value or chromaticity as that of a number of pixels included in the convex hull region.

As described above, the ratio of a salient region is high in the convex hull region, and similarly, also in an adjusted convex hull region. Consequently, it is considered that the luminance value or chromaticity of a pixel included in a convex hull region corresponds to that of a salient region.

Consequently, in the above-described configuration, the likelihood of a salient region can be made higher in a pixel having the higher possibility that the pixel has the same luminance value or chromaticity as that of a number of pixels in the convex hull region and is included in a salient region.

Further, in the image processing device according to one or more embodiments of the present invention, the convex hull region adjusting unit may exclude, from the convex hull region, a part included in a peripheral part apart from the center of the image by predetermined distance or more in the convex hull region.

The possibility that a salient region exists in a center part of an image is high and the possibility that a salient region exists in a peripheral part is low.

In the above-described configuration, the peripheral part of an image having the low possibility of being a salient region is excluded from a convex hull region. Consequently, the convex hull region includes only the central part of the image having the high possibility of being a salient region.

It is therefore considered that with the configuration, the ratio of a salient region included in a convex hull region can be increased.

Further, in the image processing device according to one or more embodiments of the present invention, in the case where a plurality of convex hull regions are generated by the region generating unit and the ratio of an area of a certain convex hull region, with respect to an area of another convex hull region, is smaller than a predetermined value, the convex hull region adjusting unit may exclude the other convex hull region from the convex hull region.

In the case where there are a plurality of convex hull regions and the areas of the convex hull regions are equal, the possibility that both of the convex hull regions include a salient region is high.

On the other hand, in the case where there are a plurality of convex hull regions and there is a large difference in the areas of the convex hull regions, the possibility that the larger convex hull region includes a salient region and the smaller convex hull region is background is high.

In the configuration, it is considered that a convex hull region in which the ratio of the area to another convex hull region is smaller than a predetermined value is excluded from the convex hull region, so that the ratio of a salient region included in a convex hull region can be increased.

Further, in the image processing device according to one or more embodiments of the present invention, in the case where a plurality of convex hull regions are generated by the region generating unit and the ratio of average prior probability of a certain convex hull region, with respect to average prior probability of another convex hull region, is smaller than a predetermined value, the convex hull region adjusting unit may exclude the other convex hull region from the convex hull region.

The average prior probability is an average of prior probabilities of all of pixels included in a certain convex hull region.

It is considered that the prior probability of a pixel included in a salient region is higher than that of a pixel included in the background.

In the configuration, in the case where average prior probabilities of two convex hull regions are compared and the ratio of the average prior probability of another convex hull region to the average prior probability of one of the convex hull region is smaller than a predetermined value, the other convex hull region is excluded from the convex hull region. Consequently, it is considered that the other convex hull region having high possibility of being background is not a convex hull region, so that the ratio of a salient region included in a convex hull region can be made higher.

Further, in the image processing device according to one or more embodiments of the present invention, the convex hull region adjusting unit may reset the convex hull region adjusted by the convex hull region adjusting unit to the convex hull region prior to the adjustment in the case where a ratio that the convex hull region adjusted by the convex hull region adjusting unit occupies the entire image is larger than a first predetermined value or smaller than a second predetermined value.

In the case where a convex hull region is adjusted by the convex hull region adjusting unit, and after that, the adjusted convex hull region is too large, the possibility that the ratio of the convex hull region included in the convex hull region becomes lower during the process of adjustment is high.

In the case where the region where a convex hull region occupies in an image is larger than a size included in a range, the possibility that the ratio of a salient region occupying the convex hull region is low is high.

In the configuration, in the case where the area of the adjusted convex hull region is larger than a predetermined first size, the convex hull region is reset to the convex hull region generated by the convex hull region generating unit. Therefore, the possibility that the ratio of the salient region in the convex hull region becomes lower can be suppressed.

In the case where the region occupied in a convex hull region image is smaller than the size included in a range, the possibility that the convex hull region does not include a major part of a salient region is high.

In the configuration, in the case where the area of the adjusted convex hull region is smaller than a predetermined second size, the convex hull region is reset to the convex hull region generated by the convex hull region generating unit. Therefore, the possibility that a salient region is not included in a convex hull region can be suppressed.

The image processing device according to one or more embodiments of the present invention may be realized by a computer. In this case, an image processing control program of an image processing device for making a computer function as the image processing device by making the computer operate as the units of the image processing device and a computer-readable recording medium in which the image processing control program is recorded are also in the scope of the present invention.

As described above, an image processing device according to one or more embodiments of the present invention is configured to detect a salient region from an image, and includes: a pixel small-region image generating unit configured to generate a pixel small-region image using, as a unit, a pixel small region made of pixels adjacent to one another and whose luminance values and/or chromaticity are similar, from the image; a prior probability calculating unit configured to calculate prior probability of likelihood of the salient region for each of the pixels of the image; a region generating unit configured to generate a salient-region-containing region having high possibility of containing a salient region on the basis of a corner point extracted from the image; a likelihood calculating unit configured to calculate likelihood of the salient region, for each of pixels of the image so that likelihood of the salient region is higher for a pixel having the same luminance value and/or chromaticity as that of larger number of pixels included in the pixel small region; and a salient region detecting unit configured to calculate posterior probability of likelihood of the salient region by using the prior probability and likelihood of the salient region. The prior probability calculating unit increases the prior probability of each of pixels constructing a pixel small region included in the pixel small-region image and having larger color distance from an adjacent pixel small region.

An image processing method according to one or more embodiments of the present invention and configured to detect a salient region from an image includes: a pixel small-region image generating step of generating a pixel small-region image using, as a unit, a pixel small region made of pixels adjacent to one another and whose luminance values and/or chromaticity are similar, from the image; a prior probability calculating step of calculating prior probability for each of pixels of the image so as to increase the prior probability of likelihood of the salient region for each of pixels constructing a pixel small region having a larger color distance from an adjacent pixel small region, in the pixel small region included in the pixel small-region image; a region generating step of generating a salient-region-containing region having high possibility of comprising a salient region on the basis of a corner point extracted from the image; a likelihood calculating step of calculating likelihood of the salient region for each of pixels of the image so that the likelihood of the salient region is higher for a pixel having the same luminance value and/or chromaticity as that of larger number of pixels included in the salient-region-containing region; and a salient region detecting step of calculating posterior probability of likelihood of the salient region by using the prior probability and likelihood of the salient region.

With the configurations, an effect is produced such that, also in the case where prior information on a salient region and a background region is not given at all, a salient region can be detected with high precision from a single image by effectively using the Bayes' theorem.

DETAILED DESCRIPTION

Hereinafter, embodiments of the present invention is described with reference to FIGS. 1 to 7. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The basic concept of one or more embodiments of the present invention is estimation of a salient region by using probability theory. Specifically, an image processing device according to one or more embodiments of the present invention is to realize high-precision salient region detection by using a salient region detecting algorithm employing the Bayesian theory (Bayes' theorem).

In the following, as Equation (1), the Bayes' theorem is expressed.

$$P\langle F|x\rangle = \frac{P\langle x|F\rangle * P(F)}{P(F) * P\langle x|F\rangle + (1 - P(F)) * P\langle x|B\rangle} \quad \text{Equation (1)}$$

In Equation (1), $P\langle F|x\rangle$ denotes posterior probability that the pixel x is a salient region, $P(F)$ denotes prior probability that the pixel x is a salient region, $P(B) = (1 - P(F))$ denotes prior probability that the pixel x is background, $P\langle x|F\rangle$ denotes likelihood that the pixel x is a salient region (that is, likelihood of a salient region), and $P\langle x|B\rangle$ denotes likelihood that the pixel x is background.

The prior probability of the salient region is probability expressing likelihood that the pixel x is a salient region under a condition that a region (corresponding to a convex hull region which is described later) like a salient region is not given.

Configuration of Image Processing Device 1

Figure 1:
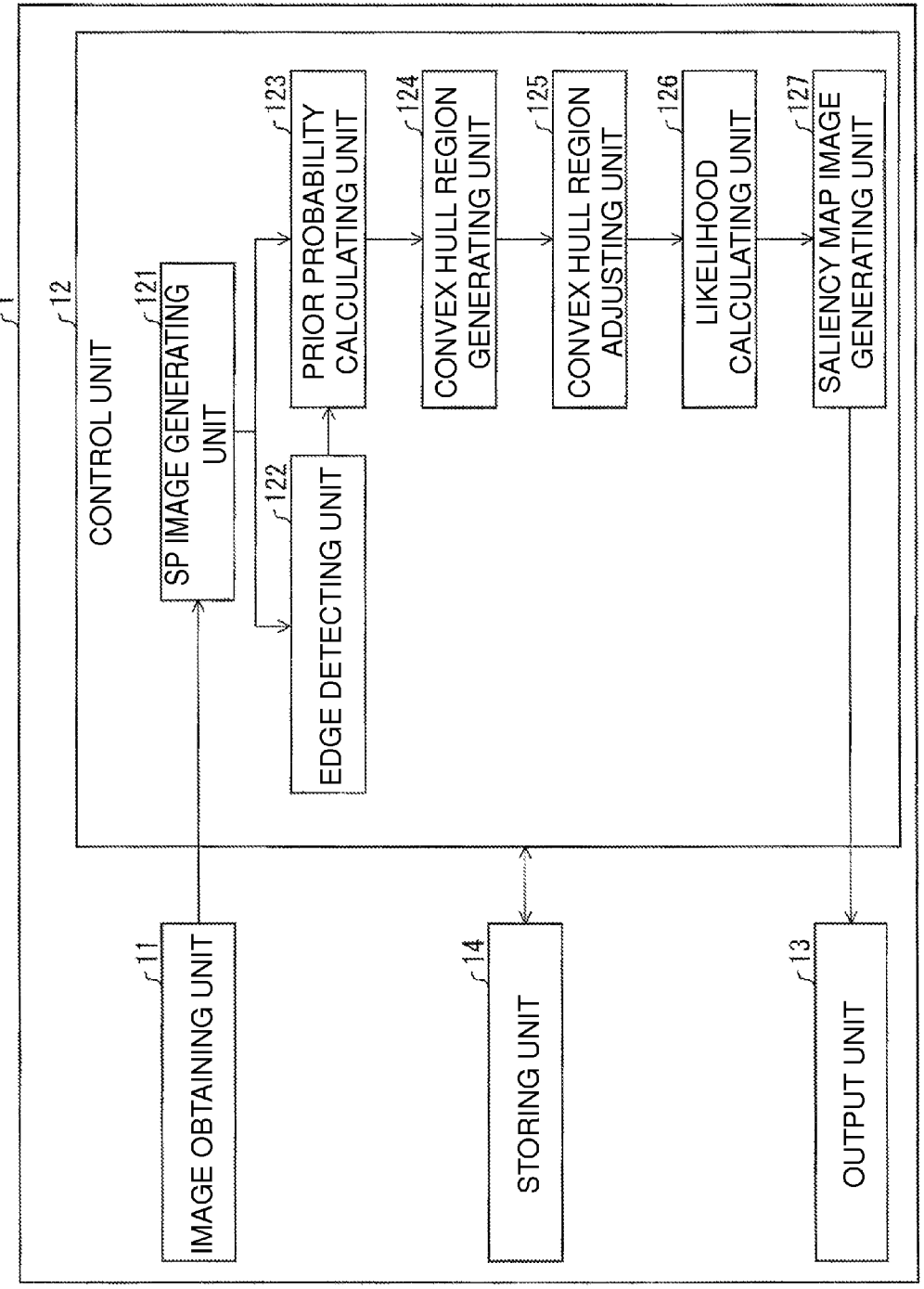
FIG. 1 is a functional block diagram illustrating an example of a schematic configuration of an image processing device according to embodiments of the present invention.

Hereinafter, the configuration of an image processing device 1 according to embodiments of the present invention is described with reference to FIG. 1. FIG. 1 is a functional block diagram illustrating the configuration of the image processing device 1.

As illustrated in FIG. 1, the image processing device 1 has an image obtaining unit 11, a control unit 12, an output unit 13, and a storing unit 14.

The image obtaining unit 11 obtains a color input image from the outside. The image obtaining unit 11 obtains, for example, in accordance with an input operation of the user, an input image from an imaging device such as a digital camera or a digital video camera connected to the image processing device 1 in a real-time manner (synchronously) or asynchronously.

The supply source of an input image is not limited. For example, the image obtaining unit 11 may obtain, as an input image, image data stored in the storing unit 14, obtain an input image from a peripheral device connected to the image processing device 1, or obtain an input image via a wired or wireless communication network.

The control unit 12 generally controls various functions in the image processing device 1. The control function of the control unit 12 is realized when a control program is executed by a processor such as a CPU (Central Processing Unit).

For example, the control unit 12 has the function and configuration for executing various processes on an input image supplied from the image obtaining unit 11. The detailed function and configuration of the control unit 12 is described later.

The output unit 13 outputs a process result of the input image by the control unit 12 to the outside. For example, the output unit 13 may output the process result to various image applications.

The storing unit 14 stores various data and programs. The storing unit 14 can be realized by combining, for example, storages such as a ROM (Read Only Memory), a RAM (Random Access Memory), and a nonvolatile memory (such as a flash memory).

In the storing unit 14, for example, programs executed in the control unit 12, various data processed by the programs, and the like are stored.

Control Unit 12

Next, each of the units in the control unit 12 is described with reference to FIGS. 1 to 3.

As illustrated in FIG. 1, the control unit 12 includes an SP image generating unit (pixel small-region generating unit) 121, an edge detecting unit (edge point correcting unit) 122, a prior probability calculating unit 123, a convex hull region generating unit (region generating unit) 124, a convex hull region adjusting unit 125, a likelihood calculating unit 126, and a saliency map image generating unit (salient region detecting unit) 127.

The SP image generating unit 121 generates a super-pixel image (SP image) using a super pixel (SP) as a unit from an original image using a pixel as a unit, which is an input image obtained from the image obtaining unit 11. The super pixel is described in a supplement to be descried later.

The edge detecting unit 122 calculates the number of edge points (contour points) of each super pixel in the super-pixel image generated by the SP image generating unit 121. The edge point is a point where the contrast difference between neighboring pixels is large.

The edge detecting unit 122 corrects the prior probability of a pixel "k" calculated by the prior probability calculating unit 123 on the basis of the number of edge points of a super pixel including the pixel "k".

The prior probability calculating unit 123 calculates prior probability of a salient region in each pixel "k" in the original image.

The convex hull region generating unit 124 detects a corner point from an image and generates, in the image, a convex hull region having a convex shape and including at least a part of the corner point. The convex shape means that the internal angle of each vertex in a figure is smaller than 180 degrees.

Specifically, the convex hull region generating unit 124 generates the convex hull region by connecting the corner points as vertexes by a straight line.

The corner point is a "conspicuous point" in an image. In many cases, such a corner point is generally generated at the border between a salient region and the background. Consequently, the possibility that a convex hull region generated by connecting the corner points includes a salient region.

Particularly, in the case where the convex hull region generating unit 124 generates a convex hull region so as to include all of the corner points in the image, the probability that a salient region is included in the convex hull region is the highest.

Figure 2:
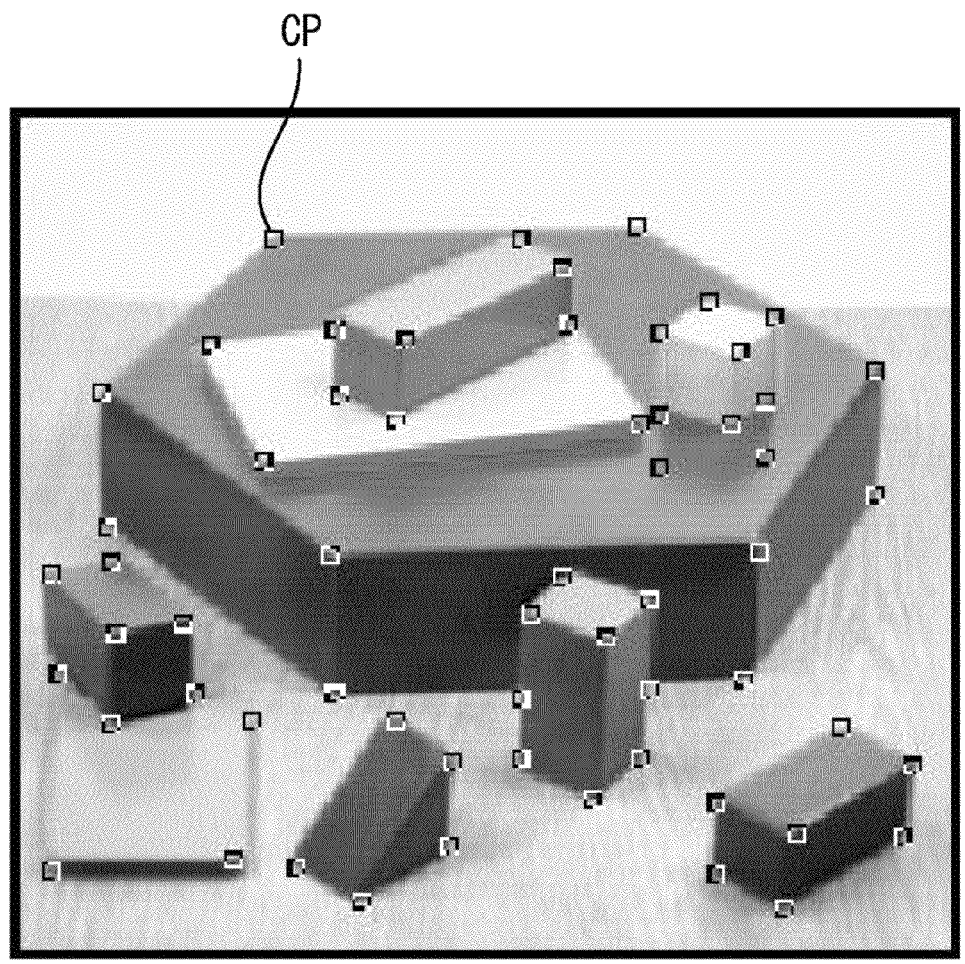
FIG. 2 is a diagram illustrating a concrete example of corner points CP.

In one or more embodiments of the present invention, as illustrated in FIG. 2, the convex hull region generating unit 124 detects points at which two or more contrast lines intersect, so-called Harris points as corner points (CP) in an original image.

Figure 3:
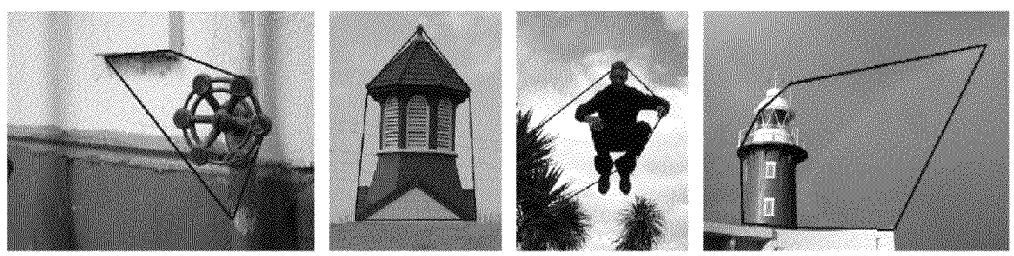
FIG. 3 is a diagram illustrating concrete examples of a convex hull region.

FIG. 3 illustrates concrete examples of the convex hull regions generated by the convex hull region generating unit 124. In FIG. 3, a polygonal shape illustrated in each of four images corresponds to a convex hull region. Although all of the convex hull regions in the images have a pentagonal shape, the invention is not limited to the pentagonal shape. That is, the convex hull region may have a convex polygonal shape having three or more vertexes.

The convex hull region adjusting unit 125 adjusts the convex hull region generated by the convex hull region generating unit 124 and calculates a region having a feature of likelihood of a salient region in the image.

The likelihood calculating unit 126 calculates likelihood of a salient region with respect to each of pixels "x" in the original image.

The saliency map image generating unit 127 generates a probability image indicative of likelihood of a salient region corresponding to the original image by using the prior probability of the salient region of each pixel, calculated by the edge detecting unit 122 and the prior probability calculating unit 123 and the likelihood of the salient region of each pixel, calculated by the likelihood calculating unit 126.

Further, the saliency map image generating unit 127 generates a saliency map image obtained by smoothing the probability image.

Flow of Salient Region Detecting Process

Next, the flow of a salient region detecting process executed by the control unit 12 of the image processing device 1 is described with reference to FIGS. 4 to 6.

Figure 4:
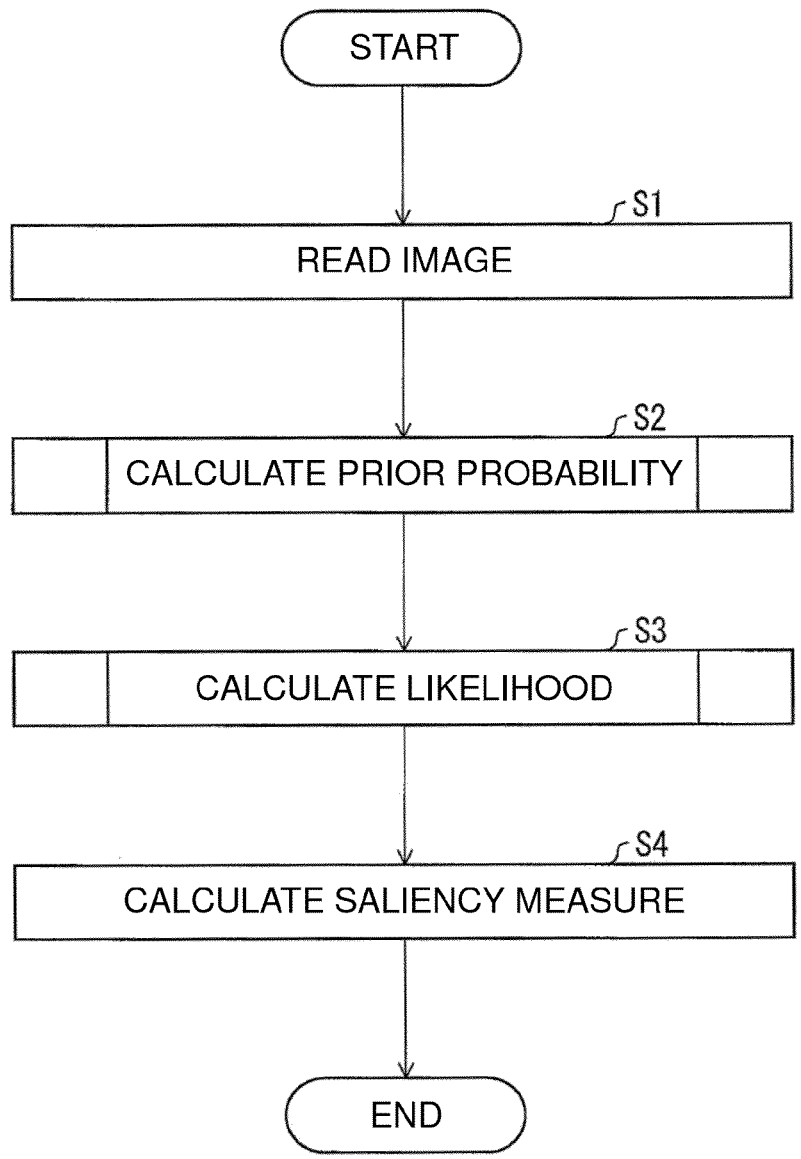
FIG. 4 is a flowchart showing the flow of a salient region detecting process executed in the image processing device illustrated in FIG. 1.

FIG. 4 is a flowchart showing the flow of the salient region detecting process executed by the control unit 12. FIG. 5 is a flowchart illustrating the details of steps of a prior probability calculating process (S2) in the salient region detecting process shown in FIG. 4. FIG. 6 is a flowchart illustrating the details of steps of a likelihood calculating process (S3) in the salient region detecting process shown in FIG. 4.

First, a general flow of the salient region detecting process according to one or more embodiments of the present invention is described with reference to FIG. 4. As illustrated in FIG. 4, the salient region detecting process includes four steps of reading of an input image (S1), a prior probability calculating process (S2), a likelihood calculating process (S3), and a salient region detecting process (S4).

In the salient region detecting process, the control unit 12 obtains an input image as an original image (S1), and after that, performs a prior probability calculating process of calculating probability $P_k(F)$ that a pixel "k" in the original image is a salient region by using a superpixel image generated from the original image (S2).

Next, the control unit 12 performs a likelihood calculating process of calculating likelihood of the pixel "k" to the salient region, that is, the degree of similarity of the pixel "k" to the salient region (likelihood) (S3). As a result, a probability image expressing a histogram of likelihood of a salient region in the original image is obtained.

Finally, the control unit 12 performs the salient region detecting process of generating a saliency map image by smoothing the probability image (S4).

In the following, the details of the three steps of S2 to S4 in the salient region detecting process is described in order.

1. Prior Probability Calculating Process (S2)

Figure 5:
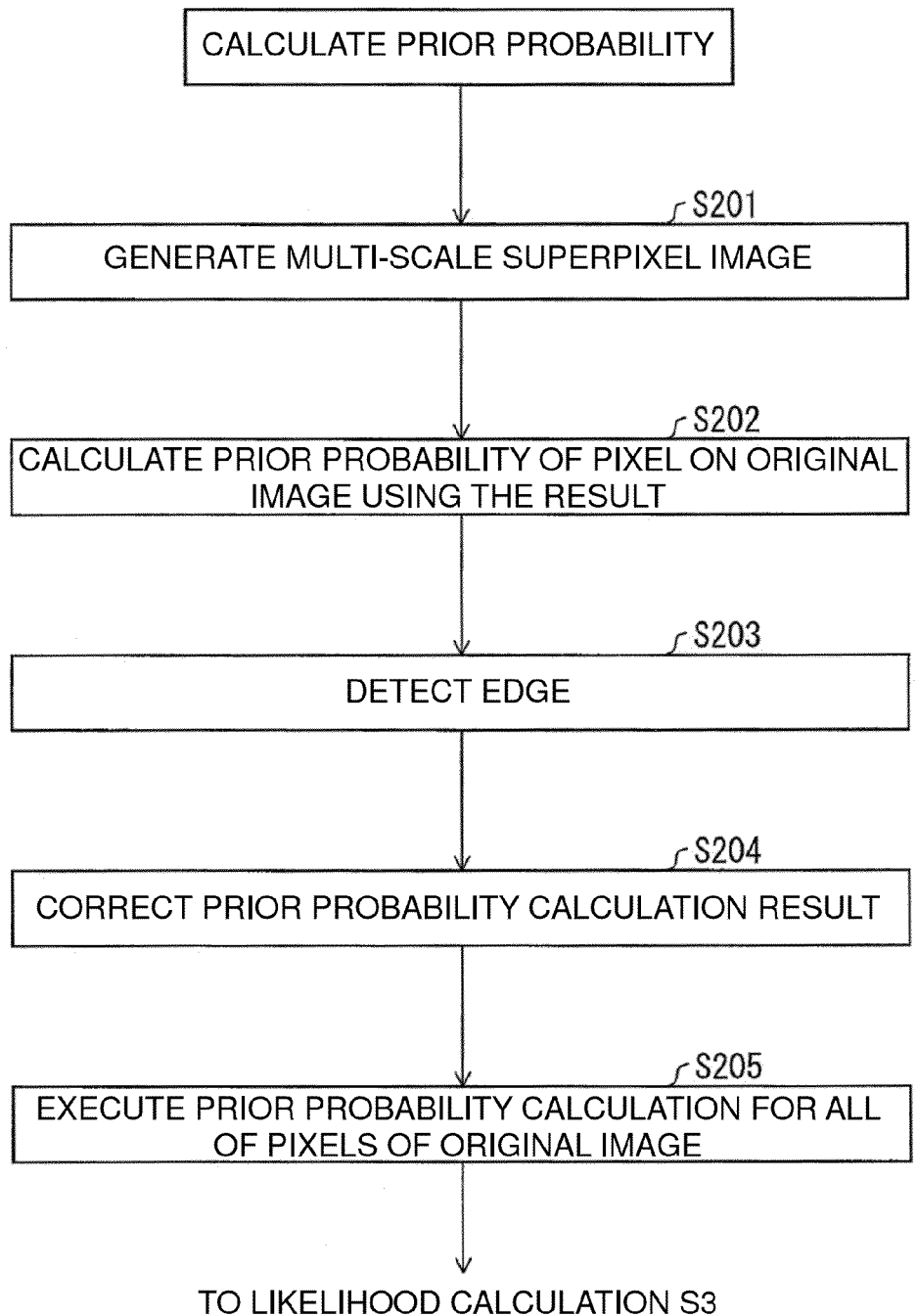
FIG. 5 is a flowchart illustrating the details of steps of a prior probability calculating process in the salient region detecting process.

Referring now to the flowchart of FIG. 5, the flow of the prior probability calculating process (S2) based on the prior probability calculation algorithm according to one or more embodiments of the present invention is described.

As illustrated in FIG. 5, in the prior probability calculating process (S2), first, the SP image generating unit 121 generates a multi-scale superpixel image (hereinbelow, simply described as "superpixel image") from an original image (S201).

After that, the prior probability calculating unit 123 calculates prior probability indicative of likelihood of a salient region of each of the pixels k of the original image (S202).

Subsequently, the edge detecting unit 122 detects an edge point in the original image (S203) and corrects $F(r_i^m)$ in the following equation (4) by using information of the edge point (S204).

Each of the processes in the steps S201 to S204 is executed on all of pixels of the original image (S205).

S202: Prior Probability Calculation of Pixel

In step S202, the prior probability calculating unit 123 calculates prior probability indicative of likelihood of a salient region in each of the pixels k of the original image by using the following equations (2) to (4) (S202).

$$P_k(F) = \frac{\sum_{m=1}^{M} F(r_k^m) D_k^m}{\sum_{m=1}^{M} D_k^m} \quad \text{Equation (2)}$$

where $$D_k^m = \frac{1}{(\|I_k - I_c(r_k^m)\| + \varepsilon)} \quad \text{Equation (3)}$$

$$F(r_i^m) = -d_c \log\left(1 - \sum_{j=1}^{N_m} w_j^m d(r_i^m, r_j^m)\right) \quad \text{Equation (4)}$$

In Equation (2),

Pk(F) denotes prior probability that the pixel k is a salient region,

M denotes the number of scales in a superpixel image, m denotes the scale number of a superpixel, and $r_k^m$ denotes a superpixel included in an image region of the scale number "m" including the pixel "k".

In Equation (3), $D_k^m$ denotes a normalized parameter for normalizing $F(r_i^m)$ shown in Equation (4), ϵ denotes a small value added to prevent the denominator of $D_k$m from becoming zero, $l_k$ denotes a luminance value or chromaticity of the pixel k, and lc(rkm) denotes a luminance value or chromaticity of a center pixel of a superpixel included in the image region having the scale number m including the pixel k.

In Equation (4), $d_c$ denotes a coordinate distance between the i-th superpixel and the center of the image, d(ri, rj) denotes a color distance between the i-th superpixel and the j-th superpixel, $N_m$ denotes the number of superpixels included in the same scale m as the i-th superpixel, and $W_j^m$ denotes the ratio of the area of the j-th superpixel to the total area of the superpixels included in the same scale m as the i-th superpixel.

As a first calculating method of the area ratio, calculation may be performed using a superpixel existing in a predetermined range in the periphery of the i-th superpixel as a superpixel included in the scale m. In this case, m corresponds to the number of superpixels existing in the predetermined range in the periphery of the i-th superpixel. As a second calculating method of the area ratio, calculation may be performed using all of superpixels other than the i-th superpixel as superpixels included in the scale m. In this case, the number M of scales is 1. From the viewpoint of placing value on a calculation amount and local information, it is desirable to calculate the area ratio by the first calculation method. The predetermined range in the first calculation method can be obtained experimentally from a calculation result of a salient region using a plurality of images on the basis of a criterion of selecting a range capable of deriving a salient region more accurately.

In the case where the image is rectangular, the center of the image may be an intersection point of a line segment connecting middle points of upper and lower sides of the image and a line segment connecting middle points of right and left sides. In the case of an image having an arbitrary shape, the center of the image may be the center of gravity of all of pixels constructing the image.

The number M of scales is the total number of the scales m when superpixels included in a superpixel image are classified by the scale m including at least one superpixel.

One scale includes, for example, a plurality of superpixels which are in contact with one another.

According to Equation (4), the larger the color distance (d($r_i$, $r_j$)) is, the larger the value of F($r_i^m$) is. Therefore, with respect to the i-th superpixel, the larger the color distance from superpixels in the periphery included in the same scale m is and the larger the color distance from a number of superpixels is, the higher the prior probability of a salient region is. Further, the prior probability depends also on the number Nm of superpixels included in the same scale.

According to Equation (4), the larger the area ratio $w_j^m$ of the j-th superpixel existing in the periphery of the i-th superpixel is, the larger the value of F($r_i^m$) is, that is, the higher the prior probability of the i-th superpixel is.

From another viewpoint, by the area ratio $W_j^m$, the color distance (d(ri, rj)) is weighted. Therefore, with respect to the i-th superpixel, it can be said that the larger the color distance from a superpixel having a high area ratio is, the higher the prior probability is.

The color distance (d(ri, rj)) may be, for example, colors defined in the LAB color space.

Further, according to Equation (4), the larger the coordinate distance $d_c$ is, the smaller the value of F($r_i^m$) is. Therefore, with respect to the i-th super pixel, the larger the coordinate distance measured from the center of the image is, the lower the prior probability of a salient region is.

S203 and S204 Correction by Edge Point

In a general image, in many cases, larger number of edge points exist in the background as compared with a salient region. Consequently, the possibility that a region having larger number of edge points, particularly, superpixel is included in the background is high.

Therefore, by performing the correction of distinguishing between a salient region and a background on the basis of the number of edge points, the precision of prior probability of a salient region can be improved.

In steps S203 and S204 in the prior probability calculating process (S2), the edge detecting unit 122 detects edge points in an original image and performs correction on the above-described value F($r_i^m$) by using information of the edge points.

Hereinafter, a method of correcting the above-described value F($r_i^m$) with the information of edge points by the edge detecting unit 122 is concretely described by using Equation (5).

$$F(r_i^m) = \begin{cases} F(r_i^m)\exp\left(\dfrac{-edn(i)}{\lambda}\right) & edn(i) \le T \\ 0 & \text{otherwise} \end{cases} \quad \text{Equation (5)}$$

where edn(i) denotes the number of edge points of the i-th super pixel.

The edge detecting unit 122 corrects the value of F($r_i^m$) on the basis of Equation (5).

According to Equation (5), as edn(i) increases, the value of F($r_i^m$) decreases exponentially. This indicates that the edge detecting unit 122 lowers the prior probability of a salient region for a pixel included in a superpixel having large number of edge points.

According to Equation (5), in the case where edn(i) is larger than a threshold T, the prior probability F($r_i^m$) of a salient region becomes zero. This indicates that in the case where the number of edge points of the (i-th) superpixel is larger than the threshold T, the edge detecting unit 122 can set the prior probability of a pixel included in the superpixel to zero.

2. Likelihood Calculating Process (S3)

Figure 6:
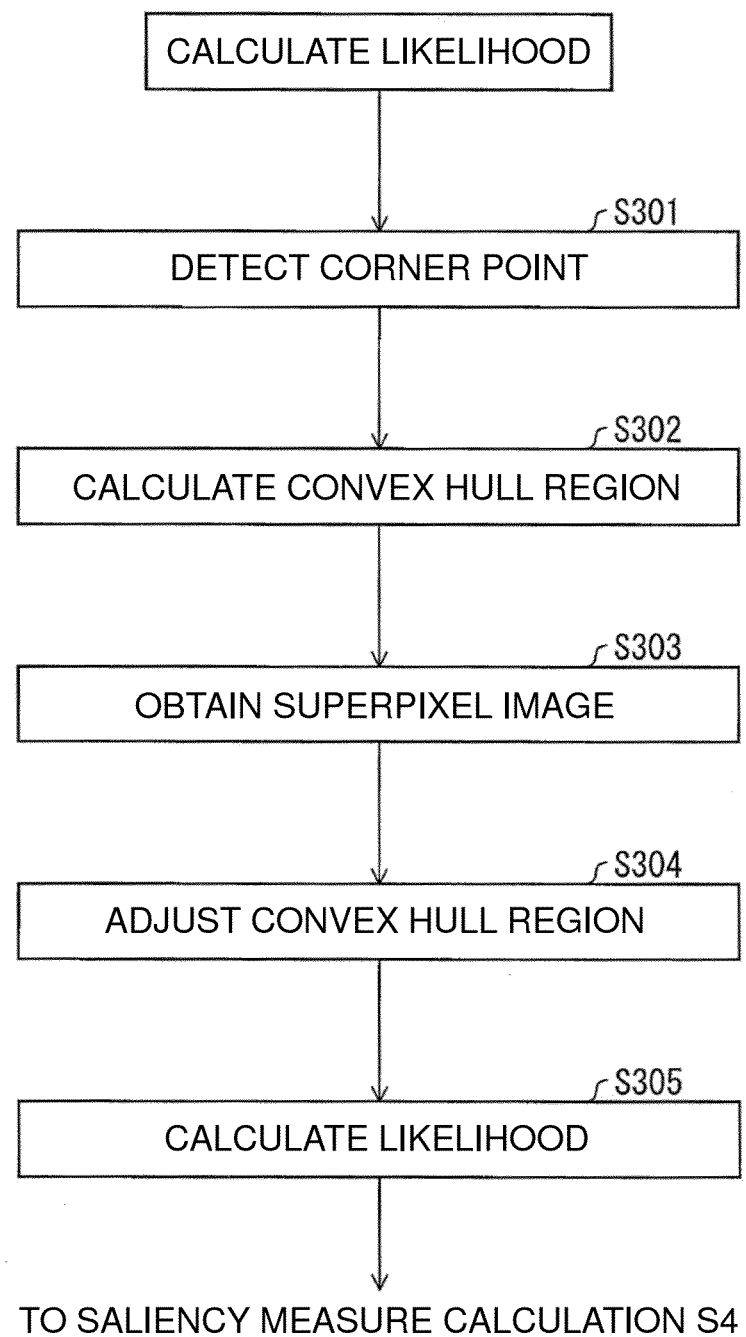
FIG. 6 is a flowchart illustrating the details of steps of a likelihood calculating process in the salient region detecting process.

Next, using the flowchart illustrated in FIG. 6, the flow of the likelihood calculating process (S3) based on the salient region detecting algorithm according to one or more embodiments of the present invention is described.

As illustrated in FIG. 6, in the likelihood calculating process (S3), first, the convex hull region generating unit 124 detects a corner point from an original image (S301).

Next, the convex hull region generating unit 124 generates a convex hull region (S302). Specifically, the convex hull region generating unit 124 generates one or plural convex hull regions each constructed by selecting three or more corner points from an original image. In the case where the total number of corner points in an original image is less than three, the convex hull region generating unit 124 uses the whole image as a convex hull region.

After that, the convex hull region generating unit 124 generates a superpixel image generated from the original image (S303).

The convex hull region generating unit 124 may use a superpixel image generated in the prior probability calculating process (S2) in place of generating a convex hull region.

Subsequently, the convex hull region adjusting unit 125 adjusts a convex hull region generated by the convex hull region generating unit 124 by the following criteria (S304).

(a) Criterion 1: Pixels existing in the periphery of an original image are excluded from a convex hull region. The periphery may be an image region apart from the center of the image by predetermined distance or longer.

(b) Criterion 2: With respect to a superpixel overlapping at least a part of a convex hull region, in the case where pixels of the predetermined ratio or larger in the pixels included in the superpixel are included in the convex hull region, all of the pixels included in the superpixel are included in the convex hull region. On the other hand, in the case where pixels of the predetermined ratio or more in the pixels included in the superpixel are not included in the convex hull region, all of the pixels included in the superpixel are excluded from the convex hull region.

(c) Criterion 3: In the case where a plurality of convex hull regions exist as convex hull regions in an image and the ratio of the area of a certain convex hull regions, with respect to the area of another convex hull region is smaller than a predetermined value, the other convex hull regions are excluded from the convex hull regions.

(d) Criterion 4: In the case where a plurality of convex hull regions exist as convex hull regions in an image and the ratio of average prior probability of the other convex hull regions, with respect to average prior probability of a certain convex hull region is smaller than a predetermined value, the other convex hull regions are excluded from the convex hull regions. The average prior probability is average of prior probabilities of all of pixels included in a certain convex hull region.

(e) Criterion 5: In the case where the occupation ratio of the convex hull region adjusted based on the criteria 1 to 4 in the whole image is larger than a first predetermined value or is smaller than a second predetermined value, the hull region after the convex adjustment is reset to the convex hull region which is prior to the adjustment.

By the criteria 1 to 5, the adjustment of the convex hull region is completed. The convex hull region after the adjustment may not have a convex shape.

In the salient region detecting algorithm of one or more embodiments of the present invention, the convex hull region adjusted by the convex hull region adjusting unit 125 is used as a temporary salient region.

Therefore, feature amount (such as the luminance value or the chromaticity) of a pixel existing in the adjusted convex hull region is a feature amount of the temporary salient region. Consequently, the likelihood of the salient region with respect to a pixel having a feature amount closer to the feature amount is higher.

Subsequently, the likelihood calculating unit 126 calculates the likelihood P<x|F> of a salient region and the likelihood P<x|B> of a background with respect to each pixel x of an original image on the basis of the following equation (7) (S305).

$$p\langle x | f \rangle = \frac{\prod_{(L,\alpha,\beta)} f(x)}{N_F}$$

$$= \frac{f^L(x^L) \cdot f^\alpha(x^\alpha) \cdot f^\beta(x^\beta)}{N_F}$$

Equation (6)

$$p\langle x | B \rangle = \frac{\prod_{(L,\alpha,\beta)} b(x)}{N_B}$$

$$= \frac{b^L(x^L) \cdot b^\alpha(x^\alpha) \cdot b^\beta(x^\beta)}{N_B}$$

Equation (7)

In Equations (6) and (7), elements of (L, a, b) are channels in the LAB color space, $N_F$ denotes the total number of pixels in an (adjusted) convex hull region, $N_B$ denotes the total number of pixels outside of the convex hull region, $f^L(x^L)$ denotes frequency that a luminance value L of a pixel x occurs in luminance values of all of pixels included in a convex hull region, and $f^\alpha(x^\alpha)$ and $f^\beta(x^\beta)$ denote frequency that chromaticity $\alpha$ or $\beta$ of a pixel x ($\beta$ is a complementary color of $\alpha$) occurs in chromaticity of all of pixels included in a convex hull region.

$b^L(x^L)$, $b^\alpha(x^\alpha)$, and $b^\beta(x^\beta)$ express frequency that the luminance value L or chromaticity $\alpha$ or $\beta$ of a pixel positioned in the pixel x occurs in the luminance value or chromaticity of all of pixels existing outside of a convex hull region.

According to Equation (7), the higher the frequency that the luminance value/chromaticity of a pixel x matches that of a pixel included in the adjusted convex hull region is, the higher the likelihood that the pixel x is a salient region is. On the other hand, the higher the frequency that the luminance value/chromaticity of a pixel x and that of a pixel which is not included in the adjusted convex hull region is, the likelihood that the pixel x is the background is high.

3. Salient Region Detecting Process (S4)

In the salient region detecting process (S4), the saliency map image generating unit 127 generates a saliency map image indicative of the saliency measure of an original image by using the prior probability calculated by the edge detecting unit 122 and the prior probability calculating unit 123 and the likelihood of the salient region calculated by the likelihood calculating unit 126.

Specifically, the saliency map image generating unit 127 calculates posterior probability P<F|x> that the pixel x of the original image is a salient region by substituting calculation results of Equations (2), (6), and (7) into Equation (1).

In such a manner, the saliency map image generating unit 127 generates a probability image obtained by associating each of the pixels x in the original image with the posterior probability by obtaining the posterior probability of each of the pixels x in the original image.

After that, by smoothing the probability image, the saliency map image generating unit 127 generates the saliency map image. Although a process method for smoothing the probability image is not limited, for example, a guided filter can be used.

Figure 7:
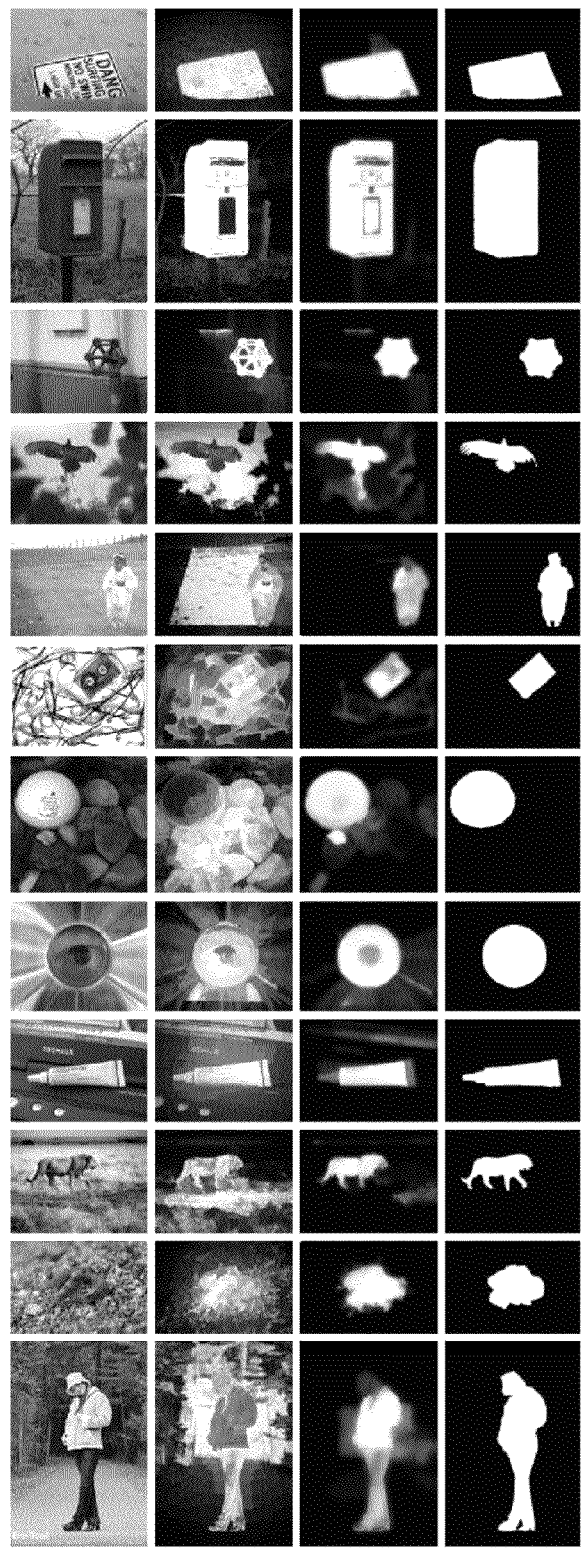
FIG. 7 is a diagram illustrating an example of a saliency map generated by using an algorithm of the salient region detection according to one or more embodiments of the present invention.

FIG. 7 illustrates an example of a saliency map image generated on the basis of the salient region detecting algorithm according to one or more embodiments of the present invention. In the diagram, images in the column at the left end are sample images for generating a saliency map image.

In FIG. 7, images in the second column from the right end are saliency map images generated on the basis of the salient region detecting algorithm according to one or more embodiments of the present invention from the sample images in the same rows.

In FIG. 7, each of the images in the column at the right end is a monochrome image obtained by manually extracting a region to be noted, that is, a correct salient region (while region) from the sample image in the same row.

Further, in FIG. 7, the second column from the left end illustrates a saliency map image for comparison generated on the basis of an algorithm other than the salient region detecting algorithm according to one or more embodiments of the present invention as a comparison example.

It is understood from FIG. 7 that in the saliency map generated on the basis of the salient region detecting algorithm according to one or more embodiments of the present invention, a region closer to while, that is, a region having higher saliency measure as compared with the saliency map image matches a white region (that is, a correct salient region) in the monochrome image.

This indicates that, by the salient region detecting algorithm according to one or more embodiments of the present invention, the saliency measure can be calculated more precisely as compared with the conventional technique.

Difference from E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010

As described above, the salient region detecting algorithm according to one or more embodiments of the present invention calculates saliency measure from an image by using the Bayesian theory (Bayes' Theorem).

On the other hand, E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010 disclose a method of calculating saliency measure by using the Bayes' theorem.

However, as described above, in E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010, the prior probability of a salient region is assumed to be a constant.

Therefore, a calculation result of saliency measure $S_0(x)$ in E. Rahtu, J. Kannala, M. Salo, and J. Heikkila, "Segmenting salient objects from images and videos", in Proceedings of European Conference on Computer Vision, 2010 becomes equal to a calculation result using a general physical model depending only on likelihood. In other words, in E. Rahtu, J. Kannala, M. Salo, and J. Heikkila, "Segmenting salient objects from images and videos", in Proceedings of European Conference on Computer Vision, 2010, it is assumed that the probability density function (corresponding to prior probability) is a constant, so that the Bayes' theorem including the term of prior probability together with the term of likelihood is not effectively used. On the other hand, in the prior probability calculation algorithm according to one or more embodiments of the present invention, different from E. Rahtu, J. Kannala, M. Salo, and J. Heikkila, "Segmenting salient objects from images and videos", in Proceedings of European Conference on Computer Vision, 2010 and Z. Tang, Z. Miao, Y. Wan, and J. Li, "Automatic foreground extraction for images and videos" in Proceedings of IEEE International Conference on Image Processing, 2010, the prior probability of a salient region is calculated in each of the pixels of the original image.

Therefore, the prior probability can be obtained more accurately as compared with the conventional technique. As a result, posterior probability which is more accurate as compared with the conventional technique can be obtained. That is, according to one or more embodiments of the present invention, the saliency measure can be calculated more precisely as compared with the conventional technique by effectively using the Bayes' theorem.

Precision of Salient Region Detection

To evaluate a salient region detecting algorithm according to one or more embodiments of the present invention, the inventors calculate a PR (Precision-Recall) curve of a salient region detected by using the salient region detecting algorithm in an image. The inventors recognize that, by the PR curve, the salient region detecting algorithm is more excellent in detection of a salient region as compared with the other algorithms (refer to FIG. 8).

Figure 8:
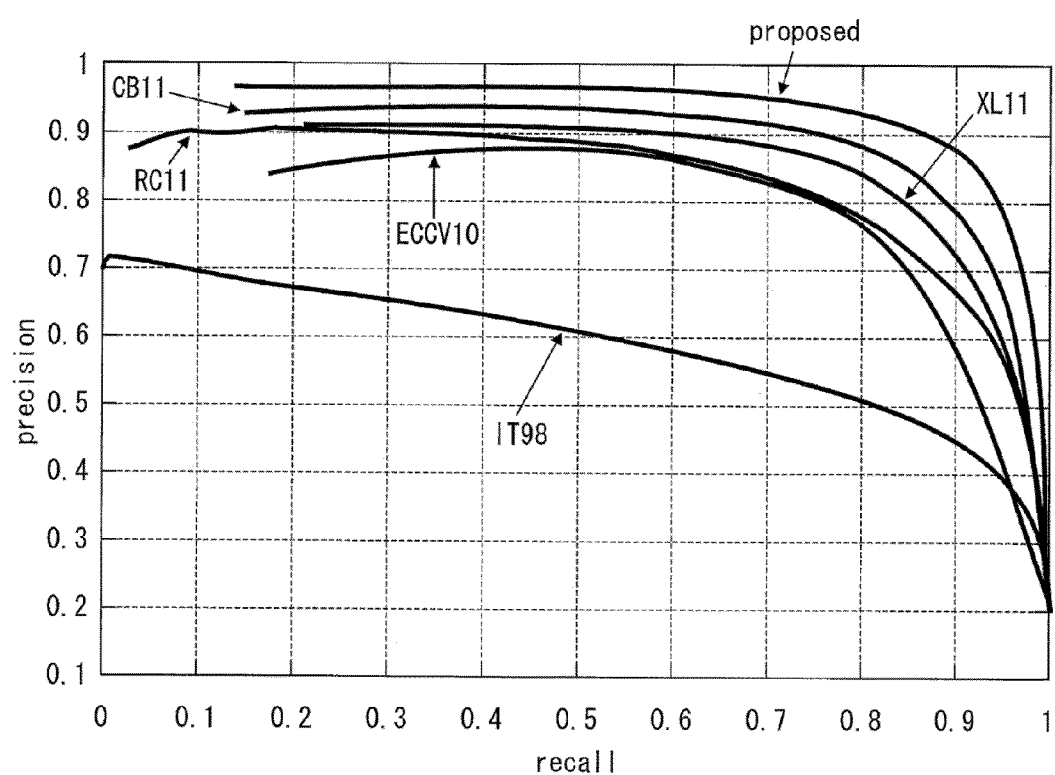
FIG. 8 is a graph illustrating a PR curve of the algorithm of the salient region detection according to one or more embodiments of the present invention.

FIG. 8 is a graph illustrating a PR curve calculated on the basis of the salient region detecting algorithm according to one or more embodiments of the present invention. In the diagram, the curve shown as "proposed" is a PR curve of the salient region detecting algorithm according to one or more embodiments of the present invention. In FIG. 8, some PR curves of algorithms other than the salient region detecting algorithm according to one or more embodiments of the present invention are also shown for comparison.

It is understood from FIG. 8 that the values of precision and recall of the PR curve shown as "proposed" are higher than those of the other PR curves. This indicates that the salient region detecting algorithm according to one or more embodiments of the present invention can detect a salient region more precisely as compared with the other algorithms.

Concretely, a PR curve can be generated as follows. First, a predetermined threshold $\alpha$ is set in a saliency map image illustrated in FIG. 7 and the conditions that when posterior probability $P(F|x) > \alpha$, $P'(x)=1$ and when $P(F|x) \leq \alpha$, $P'(x)=0$ are made correspond to each other, thereby generating a binarized image. In the generated binarized image, the region of $P'(x)=1$ corresponds to a salient region and $P'(x)=0$ corresponds to a background. By using the binary image generating method as described above, while changing the threshold $\alpha$ step by step within a predetermined range (for example, from 0 to 255), a binarized image is generated for each of the thresholds $\alpha$. From each of binarized images generated, a pair of precision and recall can be obtained. From a plurality of precisions and recalls obtained from a plurality of binarized images, a PR curve is generated.

PR Curve

The PR curve is an index expressing precision of an algorithm of calculating a salient region and indicates the relation between precision and recall.

The precision is a ratio (C/A) of a correct salient region included in a detection result A when detection of a salient region in an original image is executed. The recall is a ratio (C/B) of the salient region in the entire correct salient region B.

In the graph of the PR curves shown in FIG. 8, when the recall is close to 0, that is, when the ratio of the region C in the region B is low, the precision is close to 1. It shows that when the recall requested is small, the detection result A can be almost included in the region B.

In FIG. 8, when the recall is 1, the precision is 0.2. The value of the precision corresponds to the ratio (20%) of the size of the salient image in the entire image. This indicates that, to completely detect the region B, the entire image has to be the detection result A (convex hull region). This also indicates that even when the region B has any shape, in the case where the detection result A is an entire image, the region B is completely detected.

Supplement

Hereinafter, a superpixel is described as a supplement.

Superpixel

A pixel region made by a plurality of connected pixels having similar values in various parameters such as color and luminance is called a superpixel. An image using a superpixel as a unit and generated from an original image using a pixel as a unit is called a superpixel image so as to be differentiated from the original image.

By performing an image process using the superpixel image in place of the original image, the amount of data to be processed can be largely reduced and noise in the various parameters (such as luminance and color) can be suppressed.

As a superpixel image generation algorithm, a plurality of generation algorithms are known. In any of the generation algorithms, the total number of superpixels included in a superpixel image to be generated varies depending on a parameter used.

By using, not one parameter, a plurality of parameters, a plurality of superpixel images can be generated from the same image. The superpixel images generated are called a multi-scale superpixel image.

Realization Example by Software

Finally, each of the blocks of the image processing device 1 may be realized by hardware using a logic circuit formed on an integrated circuit (IC chip) or by software by using the CPU (Central Processing Unit).

In the latter case, the image processing device 1 includes a CPU executing an instruction of a program realizing each function, a ROM (Read Only Memory) in which the program is stored, a RAM (Random Access Memory) developing the program, and a storing device (storing medium) such as a memory storing the program and various data. According to one or more embodiments of the present invention, a recording medium has recorded thereon a program code (an executable program, an intermediate code program, or a source program) of a control program of the image processing device 1 as software realizing the above-described function to the image processing device 1 and reading and executing the program code recorded in the recording medium by the computer (or the CPU or the MPU) of the image processing device 1.

As the recording medium, a non-transitory tangible medium, for example, any of tapes such as a magnetic tape or a cassette tape, disks including magnetic disks such as a floppy (registered trademark) disk and a hard disk and optical disks such as a CD-ROM, an MO, an MD, a DVD, and a CD-R, cards such as IC cards (including a memory card) and optical cards, semiconductor memories such as a mask ROM, an EPROM, an EEPROM (registered trademark), and a flash ROM, and logic circuits such as a PLD (Programmable Logic Device) and FPGA (Field Programmable Gate Array) can be used.

The image processing device 1 may be configured so as to be connectable to a communication network and the program code may be supplied via the communication network. The communication network may be any communication network as long as it can transmit the program code. For example, the Internet, an intranet, an extranet, a LAN, an ISDN, a VAN, a CATV communication network, a virtual private network, a telephone line network, a mobile communication network, a satellite communication network, or the like can be used. As a transmission medium as a component of the communication network, any medium can be used as long as it can transmit a program code, and the present invention is not limited to a predetermined configuration or kind. For example, a wired medium such as IEEE1394, a USB, a power-line carrier, a cable TV line, a telephone line, or an ADSL (Asymmetric Digital Subscriber Line), an infrared medium such as a IrDA or a remote controller, or a wireless medium such as Bluetooth (registered trademark), IEEE802.11 wireless LAN, HDR (High Data Rate), NFC (Near Field Communication), DLNA (Digital Living Network Alliance, registered trademark), a cellular phone network, a satellite line, or a terrestrial digital network can be used. In one or more embodiments of the present invention, the program code can be also realized in a form of a computer data signal embedded in a carrier wave, embodied by an electronic transmission.

The present invention is not limited to the above-described embodiments, but can be variously changed within the scope of claims, and an embodiment obtained by properly combining technical means disclosed above is also included in the technical scope of the present invention.

One or more embodiments of the present invention may be used for an image processing device which detects a salient region from an image, and the like.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing device configured to detect a salient region from an image, comprising:
    a pixel small-region image generating unit that generates a pixel small-region image using, as a unit, a pixel small region made of pixels adjacent to one another and whose luminance values or chromaticity are similar, from the image;
    a prior probability calculator that calculates prior probability of likelihood of the salient region for each of the pixels of the image;
    a region generating unit that generates a salient-region-containing region having high possibility of containing a salient region on the basis of a corner point extracted from the image;
    a likelihood calculator that calculates likelihood of the salient region, for each of pixels of the image so that likelihood of the salient region is higher for a pixel having the same luminance value or chromaticity as that of larger number of pixels included in the pixel small region; and
    a salient region detector that calculates posterior probability of likelihood of the salient region by using the prior probability and likelihood of the salient region,
    wherein the prior probability calculator increases the prior probability of each of pixels constructing a pixel small region included in the pixel small-region image and having larger color distance from an adjacent pixel small region.

2. The image processing device according to claim 1, wherein as an area of another adjacent pixel small region is larger, the prior probability calculator increases the prior probability of each of pixels constructing the pixel small region.

3. The image processing device according to claim 2, wherein as a distance between a pixel small region and center of the image is closer, the prior probability calculator increases prior probability of each of pixels constructing the pixel small region.

4. The image processing device according to claim 2, further comprising:
    an edge point correcting unit that performs a correction, in a case where the number of edge points included in the pixel small region is equal to or less than a predetermined number, so as to decrease the prior probability of each of pixels constructing a pixel small region as the number of edge points of the pixel small region is larger, and in the case where the number of edge points included in the pixel small region is larger than the predetermined number, so as to set the prior probability of each of the pixels constructing the pixel small region to zero.

5. The image processing device according to claim 2, wherein the region generating unit generates a convex hull region in which the internal angle of each of vertexes is smaller than 180 degrees as the salient-region-containing region,
wherein the device further comprises a convex hull region adjusting unit, with respect to an upper pixel small region overlapping at least a part of the convex hull region, in the case where pixels included in the convex hull region in pixels constructing the pixel small region are larger than a predetermined first ratio, that includes the entire pixel small region in the convex hull region, and in the case where pixels included in the convex hull region in pixels constructing the pixel small region are smaller than a predetermined second ratio, that excludes the part overlapping the pixel small region of the convex hull region from the convex hull region, and
wherein the likelihood calculator calculates likelihood of the salient region for each of the pixels of the image on the basis of the convex hull region adjusted by the convex hull region adjusting unit.

6. The image processing device according to claim 1, wherein as a distance between a pixel small region and center of the image is closer, the prior probability calculator increases prior probability of each of pixels constructing the pixel small region.

7. The image processing device according to claim 6, further comprising:
an edge point correcting unit that performs a correction, in a case where the number of edge points included in the pixel small region is equal to or less than a predetermined number, so as to decrease the prior probability of each of pixels constructing a pixel small region as the number of edge points of the pixel small region is larger, and in the case where the number of edge points included in the pixel small region is larger than the predetermined number, so as to set the prior probability of each of the pixels constructing the pixel small region to zero.

8. The image processing device according to claim 6, wherein the region generating unit generates a convex hull region in which the internal angle of each of vertexes is smaller than 180 degrees as the salient-region-containing region,
wherein the device further comprises a convex hull region adjusting unit, with respect to an upper pixel small region overlapping at least a part of the convex hull region, in the case where pixels included in the convex hull region in pixels constructing the pixel small region are larger than a predetermined first ratio, that includes the entire pixel small region in the convex hull region, and in the case where pixels included in the convex hull region in pixels constructing the pixel small region are smaller than a predetermined second ratio, that excludes the part overlapping the pixel small region of the convex hull region from the convex hull region, and
wherein the likelihood calculator calculates likelihood of the salient region for each of the pixels of the image on the basis of the convex hull region adjusted by the convex hull region adjusting unit.

9. The image processing device according to claim 1, further comprising:
an edge point correcting unit that performs a correction, in a case where the number of edge points included in the pixel small region is equal to or less than a predetermined number, so as to decrease the prior probability of each of pixels constructing a pixel small region as the number of edge points of the pixel small region is larger, and in the case where the number of edge points included in the pixel small region is larger than the predetermined number, so as to set the prior probability of each of the pixels constructing the pixel small region to zero.

10. The image processing device according to claim 9, wherein the region generating unit generates a convex hull region in which the internal angle of each of vertexes is smaller than 180 degrees as the salient-region-containing region,
wherein the device further comprises a convex hull region adjusting unit, with respect to an upper pixel small region overlapping at least a part of the convex hull region, in the case where pixels included in the convex hull region in pixels constructing the pixel small region are larger than a predetermined first ratio, that includes the entire pixel small region in the convex hull region, and in the case where pixels included in the convex hull region in pixels constructing the pixel small region are smaller than a predetermined second ratio, that excludes the part overlapping the pixel small region of the convex hull region from the convex hull region, and
wherein the likelihood calculator calculates likelihood of the salient region for each of the pixels of the image on the basis of the convex hull region adjusted by the convex hull region adjusting unit.

11. The image processing device according to claim 1, wherein the region generating unit generates a convex hull region in which the internal angle of each of vertexes is smaller than 180 degrees as the salient-region-containing region,
wherein the device further comprises a convex hull region adjusting unit, with respect to an upper pixel small region overlapping at least a part of the convex hull region, in the case where pixels included in the convex hull region in pixels constructing the pixel small region are larger than a predetermined first ratio, that includes the entire pixel small region in the convex hull region, and in the case where pixels included in the convex hull region in pixels constructing the pixel small region are smaller than a predetermined second ratio, that excludes the part overlapping the pixel small region of the convex hull region from the convex hull region, and
wherein the likelihood calculator calculates likelihood of the salient region for each of the pixels of the image on the basis of the convex hull region adjusted by the convex hull region adjusting unit.

12. The image processing device according to claim 11, wherein the convex hull region adjusting unit excludes, from the convex hull region, a part included in a peripheral part apart from the center of the image by predetermined distance or more in the convex hull region.

13. The image processing device according to claim 12, wherein in a case where a plurality of convex hull regions are generated by the region generating unit and the ratio of area of a certain convex hull region, with respect to area of another convex hull region, is smaller than a predetermined value, the convex hull region adjusting unit excludes the other convex hull region from the convex hull region.

14. The image processing device according to claim 12, wherein in a case where a plurality of convex hull regions are generated by the region generating unit and the ratio of average prior probability of a certain convex hull region, with respect to average prior probability of another convex hull region, is smaller than a predetermined value, the convex hull region adjusting unit excludes the other convex hull region from the convex hull region.

15. The image processing device according to claim 11, wherein in a case where a plurality of convex hull regions are generated by the region generating unit and the ratio of area of a certain convex hull region, with respect to area of another convex hull region, is smaller than a predetermined value, the convex hull region adjusting unit excludes the other convex hull region from the convex hull region.

16. The image processing device according to claim 15, wherein in a case where a plurality of convex hull regions are generated by the region generating unit and the ratio of average prior probability of a certain convex hull region, with respect to average prior probability of another convex hull region, is smaller than a predetermined value, the convex hull region adjusting unit excludes the other convex hull region from the convex hull region.

17. The image processing device according to claim 11, wherein in a case where a plurality of convex hull regions are generated by the region generating unit and the ratio of average prior probability of a certain convex hull region, with respect to average prior probability of another convex hull region, is smaller than a predetermined value, the convex hull region adjusting unit excludes the other convex hull region from the convex hull region.

18. The image processing device according to claim 11, wherein the convex hull region adjusting unit resets the convex hull region adjusted by the convex hull region adjusting unit to the convex hull region prior to the adjustment in the case where a ratio that the convex hull region adjusted by the convex hull region adjusting unit occupies the entire image is larger than a first predetermined value or smaller than a second predetermined value.

19. An image processing method configured to detect a salient region from an image, comprising:
generating a pixel small-region image using, as a unit, a pixel small region made of pixels adjacent to one another and whose luminance values or chromaticity are similar, from the image;
calculating prior probability for each of pixels of the image so as to increase the prior probability of likelihood of the salient region for each of pixels constructing a pixel small region having a larger color distance from an adjacent pixel small region, in the pixel small region included in the pixel small-region image;
generating a salient-region-containing region having high possibility of comprising a salient region on the basis of a corner point extracted from the image;
calculating likelihood of the salient region for each of pixels of the image so that the likelihood of the salient region is higher for a pixel having the same luminance value and/or chromaticity as that of larger number of pixels included in the salient-region-containing region; and
calculating posterior probability of likelihood of the salient region by using the prior probability and likelihood of the salient region.

20. An image processing control program stored on a non-transitory computer-readable medium that causes a computer to perform an image processing method configured to detect a salient region from an image, comprising:
generating a pixel small-region image using, as a unit, a pixel small region made of pixels adjacent to one another and whose luminance values or chromaticity are similar, from the image;
calculating prior probability for each of pixels of the image so as to increase the prior probability of likelihood of the salient region for each of pixels constructing a pixel small region having a larger color distance from an adjacent pixel small region, in the pixel small region included in the pixel small-region image;
generating a salient-region-containing region having high possibility of comprising a salient region on the basis of a corner point extracted from the image;
calculating likelihood of the salient region for each of pixels of the image so that the likelihood of the salient region is higher for a pixel having the same luminance value and/or chromaticity as that of larger number of pixels included in the salient-region-containing region; and
calculating posterior probability of likelihood of the salient region by using the prior probability and likelihood of the salient region.

* * * * *